Patented July 16, 1940

2,207,750

UNITED STATES PATENT OFFICE 2,207,750

RADIO RECEIVER AND DIRECTION FINDER

Harold B. Miller, United States Navy, and Gerhard R. Fisher, Palo Alto, Calif.

Application February 3, 1937, Serial No. 123,872

14 Claims. (Cl. 250—11)

(Granted under the act of March 3, 1883, as amended April 30, 1928; 370 O. G. 757)

This invention relates broadly to radio receiving systems and more particularly to such a system wherein the reception of intelligence is accomplished simultaneously with the determination of the direction of a transmitting station.

One of the objects of this invention is to provide a system whereby the pilot of an airplane may obtain radio directional data by aural or visual means on one frequency and simultaneously maintain communication on a second frequency, using a single radio receiver for the two functions.

Another object of this invention is to provide a system for both communicating and direction finding comprising a minimum of apparatus and requiring a minimum of manipulation by the operator.

Another object of the invention is to provide a system for communicating and direction finding affording additional radio facilities over such a system that employs two separate receivers for the above mentioned functions.

Well known radio equipment in current use permits an operator to communicate or to take directional bearings alternately, using the same receiving apparatus. Other well known equipment permits an operator to communicate and to take directional bearings simultaneously by means of separate receiving apparatus. This invention, through use of a light weight "homing converter" in connection with standard equipment, permits an operator to receive intelligence and to determine direction simultaneously, on two different frequencies, though using but a single receiving apparatus.

The homing converter above mentioned comprises a directional antenna, amplifying means, frequency changing means, and detecting means adaptable for connecting in circuit with a standard radio receiver. The converter is so arranged that it may be connected to and disconnected from the receiver without affecting the normal operation of the latter. In the embodiment of the invention employing a visual directional indicator, the homing converter comprises in addition certain features of that device, including an input circuit with electronic switching means, a visual indicator, and coupling means to the output of the standard radio receiver and to a non-directional antenna which normally supplies energy to that receiver. The adaptability to and operation in connection with standard equipment is the same in principle, whether the visual indicating or the audibly-responsive embodiment is used.

While the frequency changing means illustrated and described comprises a detector and a local oscillator combined in a single multi-grid vacuum tube, separate vacuum tubes may be used for each of these devices, or any other suitable frequency changing means may be employed.

Other features and advantages of this invention are: additional receiving distance through combination of a homing converter in series with the radio receiver normally carried; economy in weight over previously used apparatus performing similar functions; independent volume and sensitivity control for each operating frequency; availability, by changing the directional antenna to a non-directional one, of the equivalent of two separate radio receivers tuned to different frequencies and connected to separate antennae; uninterrupted communication while taking directional bearings alternately on a number of transmitting stations; reduced antenna drag when carried in aircraft; determination of direction from a radio beacon transmitter on any bearing relative thereto, independent of proximity to the "beam" of such a transmitter.

A modification of this invention, described in this specification, permits the use of the directional feature in connection with a visual indicator. When used in this manner in an airplane, the indicator shows the direction in which the plane should be steered to head for a transmitting station. This eliminates the necessity for using a sense indicator to show which of two bilateral bearings is the true direction of the transmitting station toward which it is desired to head the plane.

Some of the preferred embodiments of the present invention will be described hereinafter with reference to the accompanying drawings, in which.

Figure 1:
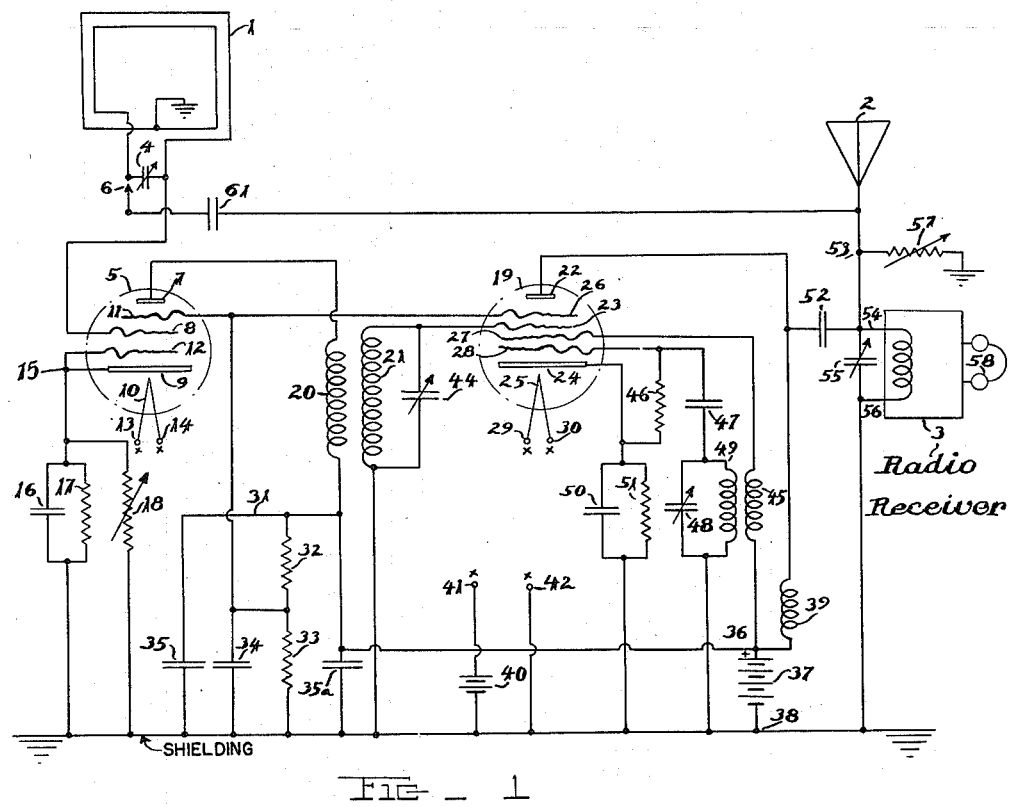
Fig. 1 shows a schematic wiring diagram of the invention.

Referring now to the drawings, in which the metallic shielding of the wave sensitive devices serves as a common ground and like numerals are used to designate like parts throughout, with particular reference to Fig. 1, 1 represents a conventional directive receiving loop, grounded at its center, for which an aperiodic or tuned antenna may be substituted. This loop may be either fixed or rotatable as, for example, it may be mounted on a rotatable shaft fitted with a calibrated scale, or it may be built in between the upper and lower wings of an airplane. An open, non-directive antenna is shown at 2, connected directly to a standard radio receiver 3. Across the terminals of loop 1 is connected variable capacity 4. One terminal of this capacity is connected to the control grid 8 of vacuum tube 5 and the other terminal is connected through switch 6 and fixed capacity 61 to the antenna 2. Tube 5 contains an anode 7, a control grid 8, a cathode 9, a heater element 10, a screen grid 11 between the anode and the control grid, and an additional grid 12 between the control grid and the cathode. The heater element 10 is provided with external contacts 13 and 14 which are connected to a source of potential. Cathode 9 and grid 12 are connected together at 15. From the junction 15 one branch circuit connects through a parallel circuit containing capacity 16 and resistance 17 to ground, and another branch circuit connects through volume control rheostat 18 to ground.

The output of amplifying tube 5 feeds the input of dual purpose tube 19 through coupling coils 20 and 21. Tube 19 fulfils the tube requirements of a detector and a local oscillator, but separate tubes may be used for these two purposes. It contains an anode 22, a control grid 23, a cathode 24, a heater element 25, a screen grid 26 between the anode and the control grid, an oscillator anode grid 27, and an oscillator control grid 28, both of the latter grids being between the control grid and the cathode. The heater element 25 is provided with external contacts 29 and 30 which are connected to a source of potential. The screen grids 11 and 26 of tubes 5 and 19, respectively, are connected together and from their junction a lead connects with a closed network 31, which comprises the following parallel elements: resistances 32 and 33 in series with each other, resistance 33 being the nearer to ground and having capacity 34 connected in parallel with it; condenser 35; and condenser 35a. The upper ends of these elements are connected together and the lower ends are grounded. The previously mentioned lead from the junction of grids 11 and 26 connects with the network at the ungrounded terminal of condenser 34. Positive potential is applied to the network 31 at the ungrounded terminal of condenser 35a from the positive terminal 36 of a plate supply battery 37, whose negative terminal 38 is grounded. The plates of both tubes are connected to positive terminal 36, plate 7 through coupling coil 20, and plate 22 through a radio frequency choke 39. A filament or heater supply battery 40 has its positive terminal numbered 41 and its negative terminal, which is grounded, numbered 42. The terminals 41 and 42 of this battery connect with the terminals 13, 14, 29 and 30 of aforementioned heater elements 10 and 25, as indicated in the drawings, by x.

Returning to dual purpose vacuum tube 19, the coupling coil 21 is connected across its input in apposition to the coil 20 in the output of tube 5, and likewise across this input is connected variable capacity 44. Oscillator anode grid 27 is connected through coupling coil 45 to the positive plate supply terminal 36. Oscillator control grid 28 is connected through resistance 46 to cathode 24, and also through a circuit, comprising series capacity 47 and a tuned circuit consisting of variable capacity 48 and coupling coil 49, to ground. Coil 49 is coupled inductively with coil 45 in the circuit of oscillator anode grid 27. Cathode 24 is connected through a parallel circuit containing capacity 50 and resistance 51 to ground.

The output of tube 19 is fed from plate 22 through capacity 52 to one input terminal 54 of receiver 3, which has variable capacity 55 connected across its input and a connection from its other input terminal 56 to ground. Antenna 2, before joining receiver 3 has, at 53, a branch connection through volume control rheostat 57 to ground. Standard radio ear phones are indicated at 58 in the output circuit of receiver 3, but any desired type of wave responsive device operable by detected energy, as for example, a recording machine, or a facsimile receiver, may be used here instead.

Figure 2:
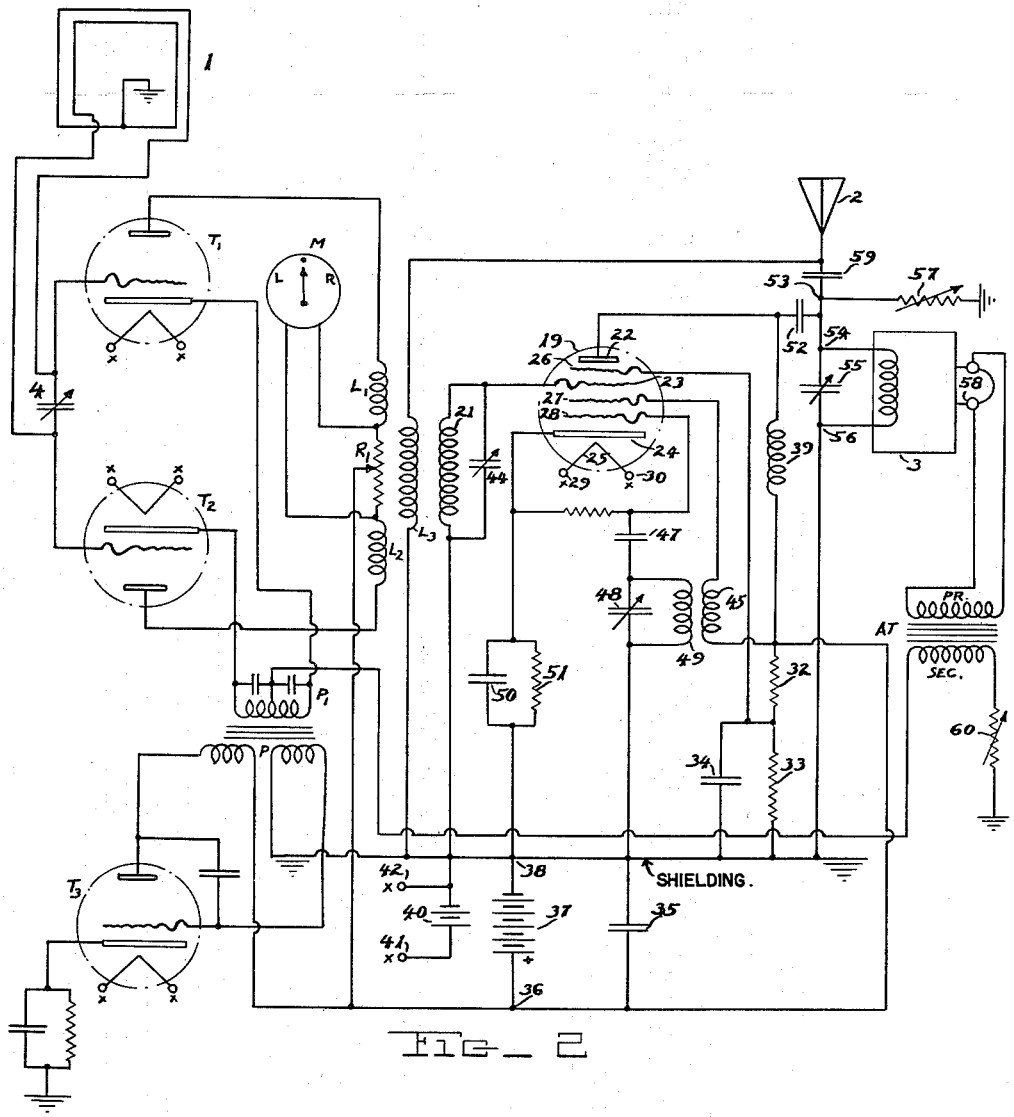
Fig. 2 is a schematic diagram of the invention as used in connection with a visual indicating device.

In Fig. 2 is shown the present invention as it may be used in conjunction with a visual indicator of the type disclosed in application Number 46,314, filed October 23, 1935, in the names of Howard N. Coulter and Gerhard R. Fisher now Patent No. 2,124,544.

The circuit comprising vacuum tube 19, receiver 3, and all circuit elements associated therewith, is identical with that described for Fig. 1 except that capacities 35 and 35a are lumped in a single capacity 35. Antenna 2 is inductively coupled to the input of vacuum tube 19 through inductance L3 in apposition to coil 21. This antenna is then further connected through a fixed capacity 59 to volume control rheostat 57 and input terminal 54 of receiver 3. The connection from antenna 2 to loop 1, through capacity 61 and switch 6 is omitted in the embodiment illustrated in Fig. 2. Additional features distinctive of this figure which do not constitute part of this invention except as used in conjunction with the homing converter, comprise: amplifier tubes T1 and T2 whose grid circuits are connected to the terminals of the loop 1 and whose plate circuits are connected to inductances L1 and L2, which are wound to oppose each other and are coupled to inductance L3 and input coupling coil 21; a visual indicator M having a scale marked "Left-Zero-Right" and connected across a resistance R1 which is connected to the other terminals of inductances L1 and L2; a separate low frequency local oscillator operating at a frequency of, say, 500 cycles per second consisting of tube T3, with local regenerative connections, and an oscillation transformer having double primary P and center-tapped secondary P1, whose outside secondary terminals are connected to the cathodes of tubes T1 and T2; and a transformer AT whose primary PR is connected to the output of receiver 3, across the telephones 58, and whose secondary SEC is connected at one end to the center tap of secondary P1 and at the other end, through the volume control rheostat 60, to ground.

The visual indicator M is an electromagnetic polarized indicator of well known type. It is obvious that as tubes T1 and T2 alternately pass current due to the action of T3 in changing the potentials on the cathodes of T1 and T2, there will be set up potentials between the terminals of M, but these potentials change so rapidly that so long as they are equal the pointer of M cannot follow them and hence indicates the average thereof, which is zero. However, when the current through either T1 or T2 is strengthened and the current through the other is weakened by a voltage from loop 1, when the voltages induced in the loop are unbalanced, there is a resultant unidirectional difference of potential between the terminals of indicator M and the pointer thereof will be moved to right or left, in accordance with the direction of displacement of loop 1 from a position normal to the path of the directional signal.

The resistors, capacities and inductances used throughout the circuits are of conventional types and their values are determined by the constants of the vacuum tubes used.

For a description of the practical operation of this invention, let us assume that the apparatus is installed in an aircraft and that the pilot or operator desires to communicate with his base on high frequency and at the same time to obtain directional data on a transmitting station which is sending out low frequency signals. When using the embodiment of the invention shown in Fig. 1, the low frequency signals, which for the purposes of this description will be called the "directional signals," are received by the loop 1 and amplified by the tube 5 and associated circuits. The amplified signal from the tube 5 is fed to the input of tube 19, which serves the dual purpose of a detector and a local oscillator tube, and there it is beaten with the local oscillations therein produced and the resultant energy is detected for further amplification. The frequency of the local oscillations is so adjusted that the beat frequency in the output of tube 19 will correspond to a frequency for which the receiver 3 is tuned, in this case a high frequency. The output of tube 19 and the non-directive antenna 2 are both connected to the input of receiver 3, which enables this receiver to absorb energy from antenna 2 independently of energy collected by loop 1 and also permits signals collected by both the loop and the antenna to be heard simultaneously at the same audio frequency in the telephones 58. In other words, the receiver 3 is tuned to the communication frequency and the communication signals are fed to it from antenna 2. The directional signals are picked up by loop 1, amplified by tube 5, heterodyned and detected by tube 19, whose output is adjusted by means of local oscillator control 48 to a beat frequency corresponding to that for which receiver 3 is tuned, and then fed to the same receiver input as the communication signals. The signals from the loop and the non-directional antenna are both present in the receiver output.

Volume controls 18 and 57 vary individually the amplitude of the two received signals, permitting an operator to control the strength of either one in the telephones. By means of variable tuning capacities 44 and 48, the converter may be adjusted independently of the receiver. When switch 6 is closed, connecting antenna 2 in circuit with the loop 1, the converter acts as a straight non-directional receiver and amplifier, adding increased range to any standard receiver to which it may be connected.

From the foregoing it will be apparent that an airplane pilot using this invention may carry on continuous communication with his base and simultaneously home his craft on a beacon at the base, employing only one standard radio receiver for both functions.

When using the modification of this invention shown in Fig. 2, the functions of the various parts not otherwise described in connection with this figure are the same as described in connection with Fig. 1. Both the communication signals and the directional signals may be heard in the telephones. The operation of the visual indicating portion of the circuit is described in detail in the aforementioned Letters Patent, No. 2,124,544, but a brief description is given herewith. The bias of potential on the cathodes of tubes T1 and T2 is selected so that these will operate on a curved portion of their grid voltage-plate current characteristic curves. Through transformer elements P and P1, the cathodes of both these tubes are subjected to the voltage supplied by the local oscillator tube T3, and through the center tap connection of P1 these cathodes are supplied from the secondary of transformer AT with the output voltage from receiver 3. During one-half cycle of the frequency produced by the local oscillator T3, increased plate current will flow in T1, and very little plate current will flow in T2, and during the other half cycle this condition will be reversed. Resistance R1 is balanced so that these changes in plate current will cause no fluctuation in the visual indicator M, and it will remain at zero reading under the influence of the local oscillator voltage alone. Now when radio frequency energy of the directional signals is received by the antenna 2, but not by the loop 1, it is fed to the input of tube 19, through inductance L3 and coupling coil 21. There it is heterodyned and detected as previously described and finally conducted to the input of receiver 3 at a high frequency corresponding to that for which the receiver is tuned. The receiver output is then impressed, by way of transformer AT, upon the cathodes of T1 and T2, with the local oscillator voltage, and the visual indicator will still remain unaffected. The tube T3 causes low frequency variations in the output of tubes T1 and T2 but since the coupling between the last mentioned tubes and the input to tube 19 is a radio frequency coupling, these variations do not get through to affect output of receiver 3. However, when a radio frequency signal is received on loop 1 in such manner that unbalanced voltages are induced in the loop the currents from T1 and T2 are unbalanced, and, since these currents carry the radio frequency signal picked up by loop 1, that signal is transmitted to the tube 19 in pulses that either add to or subtract from the input of L3 into the receiver 3, which appears in the secondary of transformer AT as pulsating voltage variations of the same frequency as that of T3 by which they are caused. This 500 cycle variation apprises the pilot that his plane is off the course toward the source of the signals. Voltages derived from the secondary of transformer AT change the potentials on the cathodes of tube T1 and T2 simultaneously and either reinforce or diminish, as the case may be, the effect of T3 on T1 and T2, thus producing greater unbalance in the currents from the tubes T1 and T2 and more strongly actuating the indicator M, even though the voltages derived from the secondary of AT are not in phase with tube T3. The magnitude of this effect is controllable by means of volume control 60. By orienting the loop, the voltage induced therein by the directional signals may be controlled so that, with the loop collecting no voltage from the distant transmitter, the indicator M will read zero, while training the loop to the right will cause the pointer to move right, and training the loop to the left will cause the pointer to move left.

The high frequency communication signals are received by antenna 2, as before, and pass through condenser 59 to volume control 57 and receiver 3, which is tuned to their frequency. These signals will then still be audible to the operator in the telephones at the same time the visual indicator is operating from energy supplied by the directional signals. This combination of the homing converter with the visual indicator will thus permit an operator to determine at all times whether he is on a course toward the transmitting station sending the directional signals, or to the right or left of such a course, and simultaneously to receive intelligence on a separate communication frequency.

While this invention is particularly adaptable for use in aircraft, it will be apparent that it is applicable to other purposes, for example, marine use.

Although specific embodiments of the invention have been illustrated and described, it will be understood that various alterations in the details of the circuits may be made without departing from the field covered by the invention, which should be limited only by the scope of the appended claims.

The invention disclosed herein may be manufactured and used by or for the Government of the United States without the payment of any royalty thereon or therefor.

We claim:

1. In a radio receiving and direction finding system a vacuum tube detector, an input circuit to said detector, a local oscillator associated with said detector, means for beating the output of said oscillator with radio frequency energy supplied to said detector, means for controlling the frequency of the beats thus produced, a tuned radio receiver, means for impressing the beat frequencies produced by the aforesaid beating means upon the input of said radio receiver, a non-directional antenna coupled to said receiver, inductive coupling means from said non-directional antenna to said detector input circuit, volume control means and a blocking condenser operatively connected between said non-directional antenna and said receiver, a signal responsive device in the output of said receiver and a visual indicating radio directional device, including volume control means, inductively coupled to both said receiver output and said detector input, whereby, with said detector output heterodyned to the frequency for which said receiver is tuned an operator in a movable conveyance may receive radio communications on one frequency and simultaneously observe his deviation from a course toward a transmitting station on another frequency.

2. In a radio receiving and amplifying system, a directional antenna, a circuit connected to said antenna for transferring radiant energy therefrom including tuning means normally tuned to intermediate or low frequencies, vacuum tube amplifying means connected with said tuned circuit, volume control means in the input circuit of said amplifier, a vacuum tube circuit performing the functions of a detector and a variable frequency local oscillator, a radio receiver designed for normal reception of relatively high frequencies, means for impressing the output of said amplifier upon the input of said vacuum tube circuit, to beat the output of said amplifier with the oscillations originating in said vacuum tube circuit to produce beat frequency energy at the frequency for which said receiver is tuned, signal responsive means in the output of said receiver, a non-directional antenna connected with said receiver for transferring thereto received energy of relatively high frequencies, volume control means in the circuit of said non-directional antenna, and means for impressing said beat frequency energy from said vacuum tube circuit upon the input of said radio receiver, whereby, with said receiver tuned to accept high frequency energy, the low frequency energy from said directional antenna may be brought to the frequency for which said receiver is tuned, signals from both the high and the low frequency sources will be present in the output of said receiver, and the amplitude of either signal may be individually controlled.

3. In a radio receiving and amplifying system a vacuum tube circuit performing the functions of a detector and a variable frequency local oscillator, a directional antenna grounded at its midpoint, a non-directional antenna, a radio receiver tuned to the frequency of energy received on said non-directional antenna means for impressing upon said vacuum tube circuit received currents from both of said antennas, the energy from said directional antennae beating with the oscillations originating in said vacuum tube circuit to produce a frequency to which said receiver is tuned, signal responsive means and a transformer primary in the output circuit of said receiver, volume control means in the circuit between said non-directional antenna and said receiver, means for impressing directly upon said receiver energy collected by said non-directional antenna and energy at said beat frequency, and a visual indicating device coupled to said transformer primary through the secondary of said transformer and to the input of said vacuum tube circuit through inductive coupling coils, said device including two vacuum tubes relatively in the two leads from said directional antenna, electronic switching means for rendering said tubes alternately operative, volume control means, and an indicating instrument for showing the direction said directional antenna should be oriented to bring the voltage in said directional antenna due to an incoming radio wave into direct phase opposition, whereby directional indications and incoming radio intelligence may be obtained simultaneously from two different frequencies, using but one receiver.

4. In a radio receiving and amplifying system, a directional antenna, amplifying means associated therewith having circuit parameters adjustable for response to radio energy of a relatively low frequency, a non-directional antenna, a radio receiver with its input connected to said non-directional antenna and having characteristics adapted to a relatively high frequency, and frequency changing means connecting the output of said amplifying means to the input of said receiver to change the energy from said amplifying means to the frequency to which said receiver is responsive, whereby the signals received from both said antennae will be simultaneously present and distinguishable in the output of said receiver, and a visual radio direction indicating device coupled to said receiver output and to said amplifying means.

5. In a radio receiving and direction finding apparatus, the combination of: a directional antenna tuned for normal reception of relatively low frequencies; means for orienting said antenna; radio frequency amplifying means operable upon energy collected by said antenna; local heterodyning means operable to modify the output of said amplifying means to produce relatively high beat frequencies, and adjustable to control the frequency of the beats thus produced; a detector operable upon said beats to produce in its output detected currents of a relatively high frequency determinable by the adjustment of said heterodyning means; a relatively high frequency radio receiving apparatus tunable to the frequency of said detector output; means for impressing said detector output upon the input of said receiver; a non-directional antenna tuned for normal reception of relatively high frequencies and independently coupled to said receiver; signal responsive means in the output of said receiver; volume control means in the circuit of said directional antenna and in the circuit of said non-directional antenna; and appropriate electrical circuits connecting the enumerated elements; whereby, when said radio receiver is tuned to a relatively high frequency communication signal being intercepted by said non-directional antenna, and a directional signal of a relatively low frequency is being intercepted by said directional antenna, said heterodyning means may be adjusted to produce in said detector output a detected current of a frequency substantially corresponding to that of said communication signal, and both of said intercepted signals may be translated simultaneously, permitting an operator to obtain communicated intelligence and directional information through use of a single radio receiver.

6. In a radio receiving and direction finding apparatus, the combination of: a directional antenna; means for orienting said antenna; radio frequency amplifying means operable upon energy collected by said antenna; local heterodyning means operable to modify the output of said amplifying means to produce beat frequencies, and adjustable to control the frequency of the beats thus produced; a detector operable upon said beats to produce in its output detected currents of a frequency determinable by the adjustment of said heterodyning means; a radio receiving apparatus tunable to the frequency of said detector output; means for impressing said detector output upon the input of said receiver; a non-directional antenna independently coupled to said receiver; signal responsive means in the output of said receiver; volume control means in the circuit of said directional antenna and in the circuit of said non-directional antenna; and appropriate electrical circuits connecting the enumerated elements; whereby, when said radio receiver is tuned to the frequency of a communication signal being intercepted by said non-directional antenna, and a directional signal of a different frequency is being intercepted by said directional antenna, said heterodyning means may be adjusted to produce in said detector output a detected current of a frequency substantially corresponding to that of said communication signal, and both of said intercepted signals may be translated simultaneously, or individually, permitting an operator to obtain communicated intelligence and directional information through use of a single radio receiver.

7. In a radio receiving and amplifying apparatus, the combination of: a first antenna tuned for normal reception of relatively low frequencies; radio frequency amplifying means operable upon energy collected by said antenna; local heterodyning means operable to modify the output of said amplifying means to produce relatively high beat frequencies, and adjustable to control the frequency of the beats thus produced; a detector operable upon said beats to produce in its output detected currents of a relatively high frequency determinable by the adjustment of said heterodyning means; a relatively high frequency radio receiving apparatus tunable to the frequency of said detector output; means for impressing said detector output upon the input of said receiver; a second antenna tuned for normal reception of relatively high frequencies and independently coupled to said receiver; signal responsive means in the output of said receiver; volume control means in the circuit of said first antenna and in the circuit of said second antenna; and appropriate electrical circuits connecting the enumerated elements; whereby, when said radio receiver is tuned to a relatively high frequency a signal being intercepted by said second antenna, and another signal of a relatively low frequency is being intercepted by said first antenna, said heterodyning means may be adjusted to produce in said detector output a detected current of a frequency substantially corresponding to that intercepted by said second antenna, and both of said intercepted signals may be translated simultaneously, or, through use of said volume control means, individually, by said signal responsive means in the output of said receiver.

8. In a radio receiving and amplifying apparatus, the combination of: a directional antenna; radio frequency amplifying means operable upon energy collected by said antenna; local heterodying means operable to modify the output of said amplifying means to produce beat frequencies, and adjustable to control the frequency of the beat thus produced; a detector operable upon said beats to produce in its output detected currents of a frequency determinable by the adjustment of said heterodyning means; a radio receiving apparatus tunable to the frequency of said detector output; means for impressing said detector output upon the input of said receiver; a non-directional antenna independently coupled to said receiver; signal responsive means in the output of said receiver; volume control means in the circuit of said directional antenna and in the circuit of said non-directional antenna; and appropriate electrical circuits connecting the enumerated elements; whereby, when said radio receiver is tuned to the frequency of a first signal being intercepted by said non-directional antenna, and a second signal of a different frequency is being intercepted by said directional antenna, said heterodyning means may be adjusted to produce in said detector output a detected current of a frequency substantially corresponding to that of said first signal, and both of said intercepted signals may be translated simultaneously, or, through use of said volume control means, individually, by said signal responsive means in the output of said receiver.

9. In a radio receiving and amplifying apparatus, the combination of: a first antenna; radio frequency amplifying means operable upon energy collected by said antenna; local heterodyning means operable to modify the output of said amplifying means to produce beat frequencies, and adjustable to control the frequency of the beats thus produced; a detector operable upon said beats to produce in its output detected currents of a frequency determinable by the adjustment of said heterodyning means; a radio receiving apparatus tunable to the frequency of said detector output; means for impressing said detector output upon the input of said receiver; a second antenna independently coupled to said receiver; signal responsive means in the output of said receiver; volume control means in the circuit of said first antenna and in the circuit of said second antenna; and appropriate electrical circuits connecting the enumerated elements; whereby, when said radio receiver is tuned to the frequency of a signal being intercepted by said second antenna, and another signal of a different frequency is being intercepted by said first antenna, said heterodyning means may be adjusted to produce in said detector output a detected current of a frequency substantially corresponding to that intercepted by said second antenna, and both of said intercepted signals may be translated simultaneously, or, through use of said volume control means, individually, by said signal responsive means in the output of said receiver.

10. In a radio receiving and amplifying apparatus, the combination of: a directional antenna; radio frequency amplifying means operable upon energy collected by said antenna; local heterodyning means operable to modify the output of said amplifying means to produce beat frequencies, and adjustable to control the frequency of the beats thus produced; a detector operable upon said beats to produce in its output detected currents of a frequency determinable by the adjustment of said heterodyning means; a radio receiving apparatus tunable to the frequency of said detector output; means for impressing said detector output upon the input of said receiver; a non-directional antenna independently coupled to said receiver; signal responsive means in the output of said receiver; volume control means in the circuit of said directional antenna and in the circuit of said non-directional antenna; appropriate electrical circuits connecting the enumerated elements; and a direct electrical connection through switching means between said directional and non-directional antennas whereby, when said switching means is open and said radio receiver is tuned to the frequency of a first signal being intercepted by said non-directional antenna, and a second signal of a different frequency is being intercepted by said directional antenna, said heterodyning means may be adjusted to produce in said detector output a detected current of a frequency substantially corresponding to that of said first signal, and both of said intercepted signals may be translated simultaneously, or individually, but when said switching means is closed, both of said antennas act as a single non-directional antenna and said amplifying, heterodyning, and detecting means serve to give additional range to said receiver.

11. A converter for use with a standard radio receiver, comprising: a directional antenna; radio frequency amplifying means operable upon energy collected by said antenna; local heterodyning means operable to modify the output of said amplifying means to produce beat frequencies, and adjustable to control the frequency of beats thus produced; a detector operable upon said beats to produce in its output detected currents of a frequency determinable by the adjustment of said heterodyning means; volume control means; electrical circuits connecting the enumerated elements; means for impressing said detector output upon the input of a radio receiver and a direct electrical connection through switching means between said directional antenna and a non-directional antenna coupled to such a receiver; whereby, with said converter coupled to said receiver, with said switching means open, and with said heterodyning means adjusted to produce beats corresponding to the resonance frequency for which said receiver is tuned, signals of different frequencies, intercepted by said non-directional antenna and by said directional antenna, may be translated simultaneously or individually by said receiver, but with said switching means closed, both of said antennas act as a single non-directional antenna and said amplifying, heterodyning, and detecting means serve to give additional range to said receiver.

12. In a combination direction finding and communicating apparatus, a pair of amplifying thermionic tubes, a directional loop antenna grounded at its midpoint, connections extending from the terminals of said loop to the grid electrodes of said tubes forming input circuits for said tubes, output circuits including a coil for each of said tubes, said coils being wound in such a way that they oppose each other, means for causing said tubes to alternately operate, one as an efficient amplifier operating on the relatively straight portion of its grid voltage plate current characteristic curve while the other operates on the curved portion, a substantially non-directional antenna, a radio receiving apparatus capable of being tuned for normal reception of relatively high frequencies, signal responsive means in the output circuit of said receiving apparatus, an electrical circuit capable of passing received currents of relatively high frequency connecting said non-directional antenna directly with said receiving apparatus, a combination circuit comprising a detector and a variable frequency local oscillator, means for impressing upon the input of said combination circuit the radio frequency waves amplified by said pair of tubes and the radio frequency waves derived from said non-directional antenna, means within said combination circuit for beating the output of said local oscillator with the radio frequency waves impressed upon said circuit to produce in the output of said detector beat frequency currents within the tuning range of said receiving apparatus, means for impressing said detector output upon said receiving apparatus, means for applying to the cathode of each of said pair of tubes a component of potential derived from the output of said receiving apparatus, and means connected in the output circuit of said pair of tubes responsive to the difference between the average anode current in said pair of tubes for indicating the relative position of said loop antenna with respect to a radio transmitting station transmitting waves received by said antennae, whereby, with said local oscillator adjusted to produce in said detector output currents at the resonant frequency of said receiving apparatus, a relatively high frequency communication signal may be received by said non-directional antenna and translated by said receiving apparatus at the same time said relative positions of the loop antenna are being indicated.

13. In a combination direction finding and communicating apparatus, a substantially non-directional means for receiving a radio frequency wave from a transmitting station, a second means for receiving a radio frequency wave from the transmitting station, said second means comprising a loop antenna having a grounded midpoint, a pair of thermionic amplifying tubes, means connecting one of the terminals of said loop to the control grid of one of said tubes, means connecting the other of the terminals of said loop to the control grid of the other of said tubes, a radio frequency output circuit for each of said tubes, said output circuits each including the primary winding of a radio frequency transformer, said primary windings being so wound as to oppose each other, a secondary winding coupled to said primary windings and to an aditional primary winding, means connecting said additional primary winding to be energized under control of the radio frequency waves received by said non-directional means, a radio receiving apparatus capable of being tuned for normal reception of relatively high frequencies, an electrical circuit capable of passing received currents of relatively high frequency connecting said non-directional means directly with said receiving apparatus, signal responsive means in the output circuit of said receiving apparatus, a combination circuit energized from said secondary winding and comprising a detector and a variable frequency local oscillator, means within said combination circuit for beating the output of said local oscillator with the radio frequency waves impressed upon said circuit to produce in the output of said detector beat frequency currents within the tuning range of said receiving apparatus, means for impressing said detector output upon the input of said receiving apparatus, means for varying the potential difference between the grid electrode and the cathode of each of the tubes of said pair in accordance with a detected component of current derived from the output of said receiving apparatus, including a device having a substantially low frequency output for causing said pair of tubes to operate alternately, one as an efficient amplifier operating on the relatively straight portions of its grid-voltage plate current characteristic curve while the other operates on the curved portion, and means for indicating which of said pair of tubes has the greater average output current flowing therein and for indicating the value of the differential current, whereby, with said local oscillator adjusted to produce in said detector output currents at the resonance frequency of said receiving apparatus, the amount of angular deviation of said loop antenna from the plane of absolute phase opposition with respect to a given radio transmitting station may be observed and at the same time a communication signal on a relatively high frequency may be received by said non-directional means and translated by said receiving apparatus.

14. In a combination direction finding and communicating apparatus, a pair of heater type thermionic amplifying tubes having cathode, anode, and control electrodes, a directional loop antenna connected to the control electrodes of said tubes so as to impress thereon received radio frequency waves of the same frequency and amplitude but 180° out of phase in the two tubes, a source of modulating frequency connected to the cathode of each of said tubes to vary the potential of said cathodes with respect to ground at the same frequency and amplitude but 180° out of phase in the two tubes, a substantially non-directional antenna, a radio receiving apparatus normally operable upon relatively high frequencies, an electrical circuit capable of passing received currents of relatively high frequency connecting said non-directional antenna directly with said receiving apparatus, signal responsive means in the output of said receiving apparatus, a combination circuit comprising a variable frequency local oscillator and a detector, means within said combination circuit for beating the output of said local oscillator with radio frequency waves impressed thereon to produce in the output of said detector beat frequency currents within the tuning range of said receiving apparatus, means for simultaneously impressing upon the input of said combination circuit the radio frequency waves set up in the output circuits of said pair of tubes and the radio frequency waves intercepted by said non-directional antenna, means for impressing the detector output from said combination circuit upon the input of said receiving aparatus, means for varying in phase the potential of the cathodes of both of said pair of tubes with respect to ground at a frequency derived from the output of said receiving apparatus, and an indicating device responsive to the difference of current flow in the output circuits of said pair of tubes, whereby, with said local oscillator adjusted to produce in said detector output current at the resonant frequency of said receiving apparatus, said indicating device will operate to show deviation of the plane of said loop from a plane of direct phase opposition with respect to a transmitting station sending directional signals of a relatively low frequency, and said receiving apparatus will operate to translate communication signals from another transmitting station sending on a relatively high frequency.

HAROLD B. MILLER.
GERHARD R. FISHER.